United States Patent
Pearson et al.

(10) Patent No.: US 8,611,067 B1
(45) Date of Patent: Dec. 17, 2013

(54) ENERGY STORAGE DEVICE

(76) Inventors: Daniel A. Pearson, Bedford, NH (US); Albert J. Feher, Mercer, PA (US)

(*) Notice: Subject to any disclaimer, the term of this patent is extended or adjusted under 35 U.S.C. 154(b) by 463 days.

(21) Appl. No.: 13/041,574

(22) Filed: Mar. 7, 2011

Related U.S. Application Data

(60) Provisional application No. 61/311,468, filed on Mar. 8, 2010.

(51) Int. Cl.
*H01G 4/008* (2006.01)
(52) U.S. Cl.
USPC .......................................................... 361/305
(58) Field of Classification Search
USPC .......... 977/773, 776, 779, 784, 762; 426/246; 361/303, 305, 306.1, 306.3, 311, 312
See application file for complete search history.

(56) References Cited

U.S. PATENT DOCUMENTS

| | | | |
|---|---|---|---|
| 7,895,721 B2* | 3/2011 | Eisenring | 29/25.41 |
| 8,361,834 B2* | 1/2013 | Poplavskyy et al. | 438/98 |
| 2009/0035644 A1* | 2/2009 | Markoski et al. | 429/40 |

* cited by examiner

*Primary Examiner* — Minh D A
(74) *Attorney, Agent, or Firm* — Daniel A. Pearson

(57) ABSTRACT

The present invention features an energy storage device and methods of storing electromagnetic energy that take advantage of the resonance transfer of energy in a dielectric matrix placed between two oppositely charged electrodes and subjected to a high voltage bias. Electromagnetic energy is stored in high-quality cavities in coated semiconducting nanoparticles.

19 Claims, 2 Drawing Sheets

ENERGY STORAGE DEVICE

CROSS-REFERENCE TO RELATED APPLICATIONS

This application claims the benefit of priority to U.S. Provisional Patent Application Ser. No. 61/311,468, filed Mar. 8, 2010, which is hereby incorporated by reference herein in its entirety.

FIELD OF THE INVENTION

The present invention relates to energy storage devices. More specifically, this application relates to a capacitor-like device in which the energy of an electric field created by the voltage potential difference between two conductors is stored in a dielectric comprising an electret-containing matrix material and polaritonic nanoparticles.

BACKGROUND

Since the advent of modern man, energy storage has been of prime concern. It can be said that much of man's progress has been due to the ability to harvest and store energy for use at a later time, whether it be the harvesting and storage of crops from agriculture to be used later as a fuel supply for the human body or the damming of waterways in order to later use the stored potential energy. Within the last 300 years, however, the manipulation of electrical energy has allowed for the concentration and storage of large amounts of energy in much smaller volumes than previously possible.

The first electrical energy storage devices took the form of what are now known as capacitors. In early experiments, water in an electrically grounded glass jar was connected to an electrode attached to an electrical generator. When the delivery of electrical power was ceased, energy created by the voltage differential between the water and the ground was stored as space charges in the glass. Modern solid-state capacitors, where energy is stored in the form of an electrostatic field between a pair of conductive electrodes, are ubiquitous because of their relatively small size and ability to be readily manufactured. Such capacitors find particular use in the field of large-scale integration, such as in integrated circuits. In a capacitor, capacitance is directly proportional to the surface areas of the conductive layers and is inversely proportional to the separation distance between these layers. Capacitance also depends on the dielectric constant of the material separating the layers and the formula for its calculation is: $C=\in A/d$, where C is the capacitance, $\in$ is the dielectric constant, A is the area of the electrodes, and d is the distance by which the electrodes are separated. The work (W) that creates the electric field by a voltage differential (V) at the electrodes, and hence the amount of energy stored is given by the formula: $W=CV^2/2$.

Attempts have been made to increase the amount of energy stored in such capacitors by either increasing the surface area of the electrodes, decreasing the distance between the electrodes, increasing the dielectric constant of the dielectric layer, increasing the voltage, or any combination of these factors. In one example, U.S. Pat. No. 7,033,406 describes a coated ceramic powder in calcium magnesium aluminosilicate glass composite matrix with a high dielectric constant situated between nickel electrodes in a multilayer design. In a similar example, U.S. Pat. No. 7,488,536 uses a different high-dielectric constant matrix of coated ceramic powder in an organic polymer matrix. In both cases, energy storage is described as being due to both the dielectric constant of the matrix material and the high voltage difference between the electrodes. In yet another example, U.S. Pat. No. 7,672,113 describes a composite containing an epoxy-containing polymer that includes ferroelectric ceramic particles in the dielectric layer.

In another capacitor design, electrolytic capacitors place a thin layer of a dielectric material between a metal (commonly aluminum, tantalum, or niobium) and an ionic conduction liquid. Electrolytic capacitors have been widely used because they are small in size yet achieve a large capacity in comparison with other types of capacitors. Recent designs include wound-type solid electrolytic capacitors that employ as the electrolyte a polypyrrole-based, polythiophene-based, polyfuran-based, or polyaniline-based conductive polymer, or a TCNQ (7,7,8,8,-tetracyanoquinodimethane) complex salt. Electrolytic capacitors have historically been plagued by problems of current leakage and durability due to the formation of cracks in the dielectric over time, potentially leading to electrical breakdown. Recently, electrolytic capacitors have incorporated solid electrolyte layers and other solid support films in order to obviate these problems. See, for example, U.S. Pat. No. 7,885,054, which describes a wound solid electrolytic capacitor.

Although chemical batteries, a term adopted by Benjamin Franklin, derive their name from the parallel combination (battery) of several capacitors, they store their energy chemically and are charged and discharged by the movement of ions through an electrolyte, which separates the electrodes. It is a redox reaction at each electrode that powers the battery with anions migrating to the anode, where they are oxidized, and cations migrating to the cathode, where they are reduced. Common types of batteries include lead acid (SLA) batteries, nickel-cadmium (Ni—Cd) batteries, and lithium-ion (Li-Ion) batteries. SLA batteries can hold a charge for up to three years and are generally used to provide backup power during emergencies. Ni—Cd batteries provide a fast, even energy discharge and are most often used to power appliances and audio and video equipment. Li-Ion batteries have the highest energy storage capacity (generally twice the capacity of Ni—Cd batteries) and are used to power portable computers, cellular phones, and digital cameras to name a few. Although the stored energy density of a typical chemical battery is quite high when compared to that of a typical capacitor, its lifetime is limited due to irreversible chemical side reactions at the electrodes.

In an attempt to overcome this limitation, U.S. Patent Application Publication No. 20100255381 describes a capacitor/battery hybrid in which inclusions are embedded in a dielectric structure between two electrodes, where electrons tunnel through the dielectric between the electrodes and the inclusions, thereby increasing the charge storage density relative to a conventional capacitor. In addition, micro- or nanostructured electrodes are described, providing an enhanced interface area relative to the electrode geometrical area.

In another attempt to move away from electrochemical energy storage, U.S. Patent Application Publication No. 20090195961 describes a 'quantum battery' in which strong dipolar rutile-phase nanoparticles, such as $TiO_2$ or $SrTiO_3$, are included in an insulating polymer resin matrix in a capacitor-like design. The nanoparticles are described as becoming conductive in a semiconductor fashion by means of 'virtual photon resonance,' which is described as a new quantum physical effect. Resonance phenomena are also described as useful for the storage of energy in U.S. Pat. No. 7,837,813, where Stone-Wales defect pairs in a carbon nanostructure are employed. Stored energy is released by a chain reaction of phonons disrupting the defect pairs to generate more phonons until the lattice returns to its original hexagonal form and the energy is released in the form of lattice vibrations.

Although seemingly unrelated to the technology discussed above because they are designed to generate electrical energy instead of storing it, some solar cells have been designed to take advantage of the resonance energy transfer phenomena of surface plasmons. In one example, U.S. Patent Application Publication No. 20110023941 describes an energy conversion device that converts light to electricity by rectifying surface plasmon polaritons. In another example, U.S. Patent Application Publication No. 20100075145 describes metal-polymer hybrid nanomaterials in which the light emitted from π-conjugated organic polymers is coupled to the plasmons of a metal surface. This type of energy transfer can be used in light-emitting diodes, solar cells, and photosensors. In yet another example, U.S. Patent Application Publication No. 20100000598 describes a photovoltaic cell that includes metallic nanoparticles or nanostructures that absorb energy via the coupling of light to surface plasmons on the nanoparticles. The absorbed energy is then transformed into an electrical current. These disclosures illustrate the potentially very efficient process of resonance energy transfer. What is needed is an energy storage device that combines the efficiency of this phenomenon not just for the conversion or transmission of electromagnetic energy, but also for its storage.

SUMMARY

Figure 1:
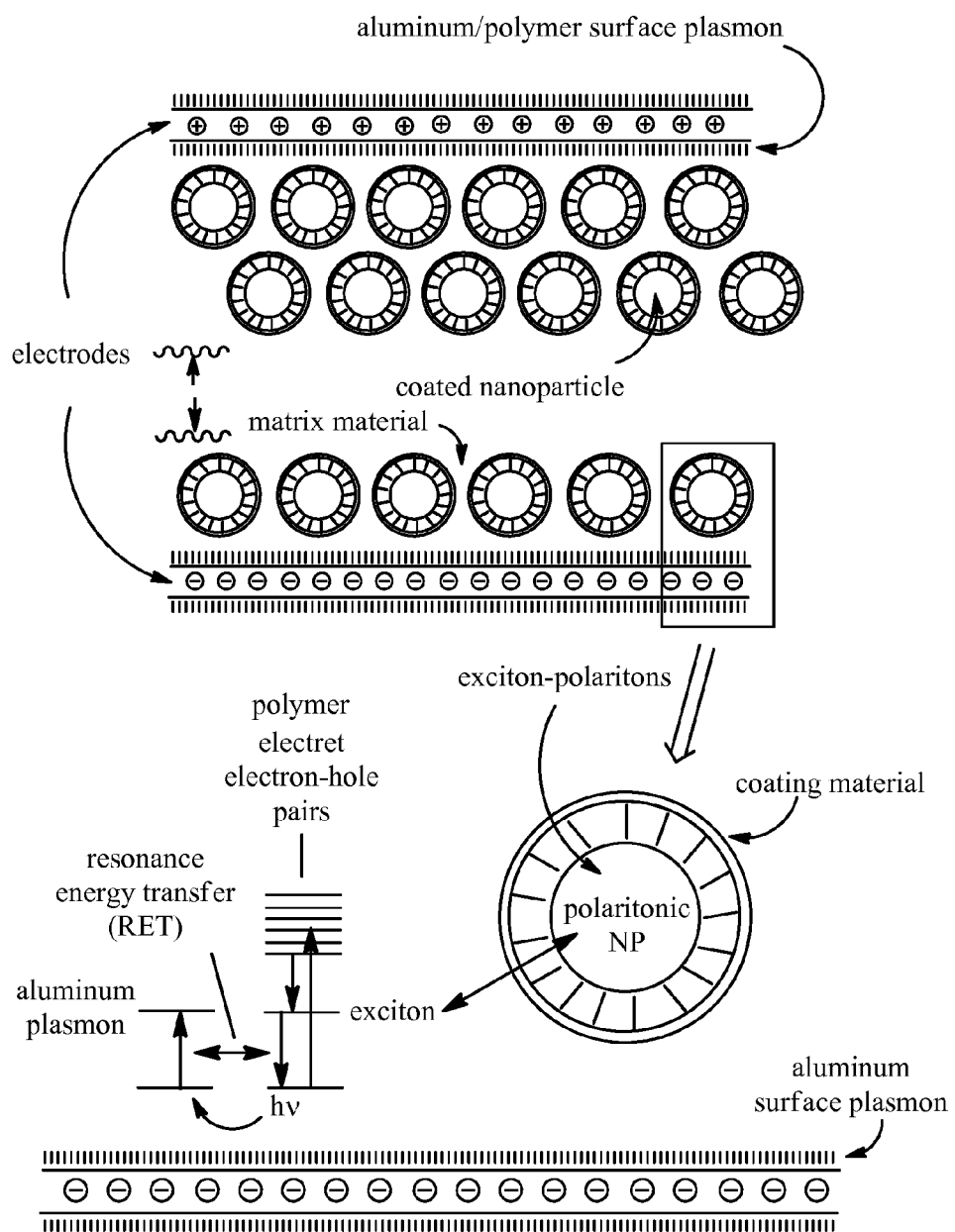
FIG. 1 includes an illustration of one embodiment of the energy storage device of the invention, showing the inclusion of coated polaritonic nanoparticles in a matrix material that is in contact with an anode and a cathode. This figure also diagrammatically summarizes some of the energetic interactions among key components of the energy storage device.

The present invention features an energy storage device and methods of storing electromagnetic energy that take advantage of the resonance transfer of energy in a dielectric matrix placed between two oppositely charged electrodes, where the matrix includes an electret-containing matrix material and paramagnetic polaritonic nanoparticles coated with an insulating layer. In particular, a high voltage bias between the electrodes creates resonating surface plasmons associated with the electrodes, resonating excitons associated with electron-hole pairs in the electret-containing matrix material that is in contact with the electrodes, and resonating quasiparticles in the coated polaritonic nanoparticles that is in contact the matrix material. Electromagnetic energy is thereby transferred to each of the polaritonic nanoparticles and sequestered in a high-quality cavity established by the composition and its coating, stored there for an indeterminate period of time, and transferred back again when needed.

DETAILED DESCRIPTION

Definitions

In the present invention, the term "about" means +/−10%, unless indicated otherwise.

The term "bandgap," also referred to as an energy gap or band gap, is an energy range in a solid where no electron states exist. Accordingly, in a graph of the electronic band structure of such a solid, the bandgap relates to the energy difference in electron volts (eV) between the top of the valence band and the bottom of the conduction band. This difference found in materials that have a large bandgap (also referred to as a wide bandgap) is greater than or equal to about 4 eV. In general, semiconductors are those materials that have a bandgap less than 4 eV and insulators have a bandgap greater than or equal to 4 eV.

The term "commensurate" means that which corresponds in amount, magnitude, or degree. For the purposes of the present invention, commensurate means that the two measured amounts are within at least about 25% of each other.

As used herein, "conjugated polymers or conjugated oligomeric molecules" refer to polymers or oligomers having a delocalized π-electron system within the polymer.

As used herein, the term "cubic," when referring to geometric shapes, means having the same general shape as a cube, such as for example, a cube with rounded corners. When referring to a lattice of bonded atoms, the term "cubic" means a crystal lattice whose unit cell is a cube and whose lattice points are located at the vertices of the cube.

The term "Curie temperature" means that temperature above which the material loses its spontaneous polarization piezoelectric characteristics.

The term "electret-containing material" means a dielectric material that has a quasi-permanent electric charge. An electret-containing material of the invention is formed by heating the material to a temperature at or above its glass temperature but below its melting temperature and subjecting the material to a strong electric field to form electron-hole pairs in the material, followed by cooling the material to ambient temperature whilst still under the influence of the electric field such that the electron-hole pairs are retained throughout the volume of the material, thereby forming an electret.

The term "exciton" means a bound state of an electron and hole which are attracted to each other by the electrostatic Coulomb force. In one example, an exciton forms when a photon is absorbed by a semiconductor. This excites an electron from the valence into the conducting band. In turn, this leaves behind a localized positively-charged hole. The electron in the conduction band is then attracted to this localized hole by the Coulomb force, which provides a stabilizing energy balance. In another example, an exciton forms when an electron-hole pair relaxes to a lower energy exciton state.

The term "high voltage" means a voltage greater than or equal to 500 volts. In some embodiments the voltage is greater than or equal to 1000 volts. In other embodiments, the voltage is greater than or equal to 2000 volts. In yet other embodiments, the voltage is greater than or equal to 3500 volts.

The term "infrared range" refers to a range of wavelengths from about 700 nm to about 2 mm. The infrared range includes the "near infrared range," which refers to a range of wavelengths from about 700 nm to about 5 μm, the "middle infrared range," which refers to a range of wavelengths from about 5 μm to about 30 μm, and the "far infrared range," which refers to a range of wavelengths from about 30 μm to about 2 mm.

The terms "luminescence," "luminesce," and "luminescent" refer to an emission of light in response to an energy excitation. Luminescence can occur based on relaxation from excited electronic states of atoms or molecules and can include, for example, chemiluminescence, electroluminescence, photoluminescence, thermoluminescence, triboluminescence, and combinations thereof. Luminescence can also be the result of the relaxation of excited states of quasi-particles, such as excitons, bi-excitons, and exciton-polaritons.

The term "majority" means 50 percent or greater.

The term "metamaterial" means any material that has been engineered to have properties that may not be found in nature. Metamaterials can be ordered composites that include artificially fabricated, extrinsic, low dimensional inhomogeneities. In one example, a metamaterial includes electromagnetic substances having negative permittivity, negative permeability, or both negative permittivity and negative permeability.

The term "nanoparticle" means a particle in which at least one diameter of the particle is less than or equal to 1.0 micron in width.

The term "overlap," when referring to energy waves, means that the frequencies of the energy waves being compared substantially overlap with each other. Such overlap can be achieved between two energy waves at the first harmonic frequency or one energy wave at the first harmonic frequency and the second energy wave at the second, third, or even fourth harmonic frequency.

The term "paramagnetic" means a substance or atom that becomes magnetic only in the presence of a magnetic field. This generally occurs due to the spin of unpaired electrons in an atomic/molecular electron orbital and paramagnetic atoms include those with a fractional spin such as 1/2, 3/2, 5/2, or 7/2. Examples of paramagnetic atoms include ions having one unpaired d-electron such as, for example, $Co^{2+}$, $Cr^{3+}$, $Mn^{2+}$ or $Gd^{2+}$. Examples also include atomic isotopes such as, for example, carbon-13.

The term "particle wave" relates to the dual nature of energy in that waves carrying energy may have a corpuscular aspect and that particles (or quasi-particles) may have a wave aspect.

The term "plasmon" means a quantum of plasma oscillation. Plasmons are collective oscillations of the free electron gas density. Plasmonic structures can be used to generate an enhanced electric field and/or magnetic field by generating resonance between an incident electromagnetic wave and plasmon waves in the structure. In one example, plasmons can be the result of a polaritonic gap at the interface of two materials with different properties. Such materials have also been referred to as "Reststrahlen materials." In yet another example, plasmons can be the result of coherent electron oscillations that exist at the interface between two materials where the real part of the dielectric function changes sign across the interface. Such can be the case at the interface between a metallic and a dielectric material. In yet another example, plasmons can be the result of the oscillation of a plasma double layer, which consists of two layers having an opposite electrical charge at an interface. When plasmons interact with a photon, a quasiparticle called a plasmon-polariton (or plasma-polariton) can be formed. As is known, an electric field and a magnetic field are two components of an electromagnetic field and plasmonic structures can be used to enhance an electric field, a magnetic field, or both an electric field and a magnetic field. Plasmonic structures can also be used to absorb certain range of wavelengths efficiently and redirect the absorbed electromagnetic energy to an adjacent material layer.

The term "perovskite ceramic" means any ceramic with a perovskite structure. The general formula for such a structure is $ABX_3$, where A-site and B-site atoms are each two different cations and X is an anion that bonds to both. In a cubic perovskite structure, the A-site atom is 12-coordinate and the B-site atom is 6-coordinate. In one embodiment, X is oxygen.

The term "polaritonic" means a structure that can support polaritons. Polartions are bosonic quasiparticles (groups of discrete phenomena whose behaviour is characterised as that of a single particle in a system) resulting from the strong coupling of electromagnetic waves with an electric or magnetic dipole-carrying excitation. Examples of polaritons include exciton-polaritons resulting from the coupling of visible light with an exciton, intersubband-polaritons resulting from the coupling of an infrared photon with an intersubband excitation, and surface plasmon-polaritons, resulting from the coupling of surface plasmons with electromagnetic energy waves.

The term "resonant frequency," also known as a resonance frequency, is the frequency of an electromagnetic energy wave in a resonating structure, such as a resonating polaritonic nanoparticle, the resonating electromagnetic waves on the surface of a metal, or the resonating electromagnetic waves of an exciton. Such waves can be defined by a Hamiltonian having one or more eigenstates and include electromagnetic waves or electron spin resonance waves. Methods of converting frequencies of electromagnetic energy to wavelengths (presented as lambda ($\lambda$) values) are well known to those skilled in the art and it is understood that each recited frequency corresponds to a wavelength and visa versa.

The term "resonance energy transfer" means the energy that is transferred between two entities in proximity to each other when the first entity has a resonant frequency of electromagnetic energy that overlaps with a resonant frequency of the second entity.

The term "spherical" means having a geometric shape whose features include those of a sphere. For example, an oblong sphere is spherical.

The term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide. Examples include those characteristics, parameters, or values that are within 90% to 110% of that which has been recited.

The term "ultraviolet range" refers to a range of wavelengths from about 5 nm to about 400 nm.

The terms "uniformly" or "uniform" means that the parameter that these terms apply to varies no more than +/−10% of the relevant metric. For example, a coating of a uniform thickness of 10 nanometers would be no thicker than 11 nanometers and no thinner than 9 nanometers.

The term "visible range" refers to a range of wavelengths from about 400 nm to about 700 nm.

The Energy Storage Device

In a first aspect, the invention features a device for storing energy comprising two electrodes consisting of an anode and a cathode, a voltage control device connected to a power source, and a dielectric composition between the two electrodes, wherein the dielectric composition comprises:

(a) multiple polaritonic nanoparticles, the majority of which have diameters within a predetermined range, wherein each of the polaritonic nanoparticles has at least one resonant frequency and comprises a paramagnetic atom;

(b) a coating material in contact with the polaritonic nanoparticles, wherein the coating material completely encapsulates each of the polaritonic nanoparticles with a uniform thickness that varies no more than +/−10% in diameter and comprises a bandgap attenuating the propagation of electromagnetic energy of at least one resonant frequency through the coating material; and (c) an electret-containing matrix material in contact with the coating material and the electrodes, wherein when a voltage differential is created between the two electrodes by the voltage control device, an electric field is created in the dielectric composition, an exciton is created in the matrix material, and a first plasmon forms at the interface of the electrodes and the matrix material, wherein the frequencies of the first plasmon overlaps with the frequency of the exciton and that of a resonance frequency of an electromagnetic energy wave in the polaritonic nanoparticle.

In one embodiment, the energy stored is electromagnetic energy.

In one embodiment, each of the electrodes includes aluminum, copper, indium, gallium, gold, or silver. In a further embodiment, each of the electrodes includes aluminum.

In another embodiment, each of the electrodes has a thickness of from about 0.1 micron to about 1.0 micron, such as for example, about 0.1 micron, about 0.15 micron, about 0.2 micron, about 0.3 micron, about 0.4 micron, about 0.5 micron, or about 1.0 micron.

In another embodiment, each of the electrodes supports a plasmon wavelength in the UV, visible, or near-IR region. In another embodiment, the metallic nanoparticle supports a plasmon resonance in the UV region. In yet another embodiment, the metallic nanoparticle comprises aluminum and supports a plasmon resonance with a wavelength in the range of about 350 nm to about 400 nm.

In one embodiment, the surface of at least one of the electrodes that contacts the matrix material is coated with a layer of metallic nanoparticles, such as aluminum, copper, indium, gallium, gold, or silver nanoparticles. In a further embodiment, the metallic nanoparticle includes aluminum. The metallic nanoparticles may be essentially entirely metal or be in the form of a core-shell composition, with the core comprising a low dielectric material (e.g., silicon dioxide or aluminum oxide) and the shell essentially consisting of the metal or the core essentially consisting of the metal and the shell comprising a low dielectric material (e.g., silicon dioxide or aluminum oxide). The metallic nanoparticle coating that adjoins each electrode may extend into the matrix material to a depth of about 0.1% to about 1% of the distance between the electrodes.

In an arrangement in which the metallic nanoparticles do not only directly contact the electrodes, electromagnetic energy can be transferred directly from the surface plasmons of the metallic nanoparticles to the resonant energy waves in the polaritonic nanoparticles that are not direcly proximal to the electrodes. Accordingly, in another embodiment, the metallic nanoparticles are dispersed in the matrix material to a depth of about 5%, 10%, 20%, or 30% of the distance between the electrodes and accounts for up to about 10% of the total volume of the matrix material such as, for example, about 0.1%, 0.5%, 1%, 2%, 3%, 4%, 5%, or 10% of the total volume of matrix material where the metallic nanoparticles are present. In another embodiment, metallic nanoparticles are evenly distributed throughout the matrix material and accounts for up to about 10% of the total volume of the matrix material such as, for example, about 0.1%, 0.5%, 1%, 2%, 3%, 4%, 5%, or 10% of the total volume of matrix material.

In yet another embodiment, the coating material of the polaritonic nanoparticles is further coated with one or more layers of metallic nanoparticles, thereby forming a metal/insulator/semiconductor layering arrangement. In a further embodiment, the metallic nanoparticle coating is from about 2 nm to about 100 nm thick.

In one embodiment, the metallic nanoparticle supports a plasmon wavelength in the UV, visible, or near-IR region. In another embodiment, the metallic nanoparticle supports a plasmon resonance in the UV region. In yet another embodiment, the metallic nanoparticle comprises aluminum and supports a plasmon resonance with a wavelength in the range of about 350 nm to about 800 nm.

In another embodiment, the metallic nanoparticles have a minimum diameter (i.e., the diameter of its smallest geometrical feature) of from about 5 to about 100 nanometers. In a further embodiment, the metallic nanoparticles have a minimum diameter of about 20 to about 50 nanometers. In another embodiment, the metallic nanoparticles have a minimum diameter of about 50 nanometers with an aluminum core and an aluminum oxide shell of about 2 nanometers.

In another embodiment, the metallic nanoparticles are spherical. In yet another embodiment, the metallic nanoparticles have triangular geometrical features.

In one embodiment, the surface of at least one of the electrodes contacting the matrix material is corrugated, where the length of the ridges of the corrugation is orthogonal to the direction of the electric field in the dielectric composition. In another embodiment, adjacent ridges of the corrugation are separated from each other by about a distance of less than the first plasmon frequency.

In order to form the electret-containing matrix in the energy storage device of the invention, an electric field is applied to the polaritonic nanoparticle-containing matrix material composition at a suitable voltage when the temperature is at or above the matrix material's glass temperature ($T_g$) but below the melting temperature. In one embodiment, the matrix material has a glass temperature that is greater than or equal to 60° C. In a further embodiment, the matrix material's glass temperature is greater than or equal to 80° C. Typically, constant voltage is applied to the electrodes in contact with the composition at the chosen temperature and the composition is cooled to about 23° C. while the constant voltage is still being applied. Exemplary voltages are in the range of from 2000 to 5000 volts. Typically, the cooling time is 5 minutes to 30 minutes. In one embodiment, a corona poling technique is used and the electric field is oriented 20 degrees to 60 degrees in relation to the planar layers of dielectric material. In another embodiment, a corona poling technique is used and the electric field is oriented 40 degrees to 50 degrees in relation to the planar layers of dielectric material. In yet another embodiment, a corona poling technique is used and the electric field is oriented 45 degrees in relation to the planar layers of dielectric composition.

In one embodiment, the electret-containing matrix includes an organic polymer or co-polymer that includes an aromatic ring system such as, for example, a polymer containing phenyl, naphthalene, anthracene, phenanthrene, tetracene, pyrene, benzopyrene, chrysene, picene, carbazole, fluorene, biphenyl, terphenyl, triphenylene oxide, dihalobiphenyl, trans-stilbene, or 1,4-diphenylbutadiene moieties. Specific examples include: (i) polyethylene terephthalate (PET, $T_g$=75° C.); (i) polyethylene naphthalate (PET, $T_g$=120° C.); (iii) polycarbonate (PC, $T_g$=152° C.); (iv) polyetherimide (PEI, $T_g$=231° C.); (v) biphenyl tetracarboxylic acid dianhydride-paraphenylenediamine polyimide (BPDA/PDA, $T_g$=320° C.; (vi) 4' acryloxyamino-4 nitroazobenzene ($T_g$>180° C.), or (vii) 4-[N-(2-maleimidoethyl)-N-methylamino]-4'-nitroazobenzene (MENA)/alpha-methylstyrene co-polymer ($T_g$=160° C.).

In a further embodiment, an additional polymer is mixed with the aromatic ring-containing polymer to reduce oxygen and/or water permeability. Examples of polymer additives include polyvinyl alcohol by itself or containing other additives.

In another further embodiment, $Ti(OBu)_4$ is used as catalyst for preparation of the polymers to be used in the electret-containing matrix of the invention.

In the energy storage device of the invention, the electret-containing matrix material forms a composition when combined with the coated polaritonic nanoparticles. In one embodiment, the volume ratio of the electret-containing matrix material to coated polaritonic nanoparticles in the dielectric layer established between electrodes is from 40/60 to 5/95.

The electret-containing matrix material can also include a light-emitting polymer (LEP). LEP materials are typically conjugated polymeric or oligomeric molecules. Such polymers or oligomers are semiconducting and can support positive and negative charge carriers along the polymeric or oligomeric chain. Accordingly, in one embodiment the electret-containing matrix emits electromagnetic energy when subjected to an electric field (e.g., photons created via electroluminescence). Examples of electroluminescent polymers include the aromatic ring-containing polymers described above. In one embodiment, the LEP emits electromagnetic energy with a frequency that overlaps that of the first plasmon and that of a resonance frequency of an electromagnetic energy wave in the polaritonic nanoparticle.

In one embodiment, the polaritonic nanoparticles are $ABO_3$ perovskite polaritonic nanoparticles having a Curie temperature of less than or equal to 80° C. In a further embodiment, the polaritonic nanoparticles have a Curie temperature of less than or equal to 23° C. In another embodiment, each of the polaritonic nanoparticles has a cubic crystal lattice. In yet another embodiment, the polaritonic nanoparticles assume the geometry of cubic class 432.

In one embodiment, the polaritonic nanoparticles are a modified $BaTiO_3$ perovskite that includes a paramagnetic atom having one unpaired d-electron at the B-site, where the Ti is replaced by the paramagnetic atom at a molar ratio of up to and including 0.1. In a further embodiment, the magnetic moment of the paramagnetic atom is in excess of 1/2, for example, 5/2 to 7/2. Such atoms include $Co^{2+}$, $Cr^{3+}$, $Mn^{2+}$, or $Gd^{2+}$. In one embodiment, the paramagnetic atom is $Mn^{2+}$ or $Gd^{2+}$. In a further embodiment, the paramagnetic atom is $Mn^{2+}$ In another embodiment the polaritonic nanoparticles include Sn at the B-site with a Sn molar ratio of up to and including 0.5. In a further embodiment, the polaritonic nanoparticles include Sn at the B-site with a Sn molar ratio of up to and including 0.2.

In one embodiment, the polaritonic nanoparticle of the invention has the formula $(Ba_{1-x-y}Ca_xA_y)[Ti_{1-a-b-c}Sn_aB_bM_c]O_3$, wherein A is Ag, Gd, Mg, Nd, Pr, or Sr; B is Al, Dy, Er, Ga, Ho, La, Nb, Ni, Sc, Ta, Y, Yb, Zn, Zr, or V; M is Co, Cr, Mn, or Gd; x is 0 to 0.1; y is 0 to 0.1; a is 0.01 to 0.5; b is 0 to 0.3; and c is 0.001 to 0.05, wherein 1-a-b-c is greater than or equal to 0.5. Examples include $(Ba_{0.96}Ca_{0.04})$ $[Ti_{0.815}Mn_{0.0025}Nb_{0.0025}Zr_{0.10}Sn_{0.08}]O_3$, $(Ba_{0.9575}Ca_{0.04}Nd_{0.0025})$ $[Ti_{0.8175}Mn_{0.0025}Y_{0.10}Sn_{0.08}]O_3$, $(Ba_{0.9575}Ca_{0.04}Nd_{0.0025})$ $[Ti_{0.8175}Mn_{0.0025}Zr_{0.10}Sn_{0.08}]O_3$, and $(Ba_{0.9575}Ca_{0.04}Nd_{0.0025})$ $[Ti_{0.8175}Mn_{0.0025}Sn_{0.18}]O_3$.

In another embodiment, the polaritonic nanoparticle of the invention has the formula $(Ba_{1-x-y}Ca_xA_y)[Ti_{1-a-b-c}Sn_aB_bM_c]O_3$, wherein A is Gd, Mg, Nd, Pr, or Sr; B is Ta, Y, Zn, or Zr; M is Co, Cr, Mn, or Gd; x is 0 to 0.1; y is 0 to 0.1; a is 0.01 to 0.1; b is 0 to 0.1; and c is 0.001 to 0.05.

In another embodiment, the polaritonic nanoparticle of the invention has the formula $(Ba_{1-x-y}Ca_xA_y)[Ti_{1-a-b-c}Sn_aB_bM_c]O_3$, wherein A is Gd, Mg, Nd, Pr, or Sr; B is Ta, Y, Zn, or Zr; M is Co, Cr, or Gd; x is 0 to 0.1; y is 0 to 0.1; a is 0 to 0.5; b is 0 to 0.3; and c is 0.001 to 0.05, wherein 1-a-b-c is greater than or equal to 0.5. Examples include $(Ba_{0.9575}Ca_{0.04}Nd_{0.0025})$ $[Ti_{0.8175}Gd_{0.0025}Y_{0.18}]O_3$ and $(Ba_{0.9575}Ca_{0.04}Nd_{0.0025})$ $[Ti_{0.8175}Co_{0.0025}Y_{0.18}]O_3$.

Other exemplary polaritonic nanoparticles of the invention has the formula $Ca(Cu_{3-x}A_x)[Ti_{4-a-b-c}Sn_aB_bM_c]O_{12}$, wherein A is Zn, Mg, Nd, Pr, or Sr; B is Al, Dy, Er, Ga, Ho, La, Nb, Ni, Sc, Ta, Y, Yb, Zn, Zr, or V; M is Co, Cr, Mn, or Gd; x is 0 to 0.15; a is 0 to 0.5; b is 0 to 0.3; and c is 0.001 to 0.05, wherein 1-a-b-c is greater than or equal to 0.5.

Yet other exemplary polaritonic nanoparticles of the invention has the formula $Ca(Cu_{3-x}A_x)[Ti_{4-a-b-c}Sn_aB_bM_c]O_{12}$, wherein A is Zn, Mg, Nd, Pr, or Sr; B is Al, Dy, Er, Ga, Ho, La, Nb, Ni, Sc, Ta, Y, Yb, Zn, Zr, or V; M is Co, Cr, Mn or Gd; x is 0 to 0.1; a is 0 to 0.2; b is 0 to 0.1; and c is 0.001 to 0.05. In one embodiment, a is 0.05 to 0.2.

In one embodiment, the energy storage device of the invention includes polaritonic nanoparticles, the majority of which are of cubic or spherical geometry and having at least one diameter that is less than or equal to about 0.9 microns as measured along an axis of the crystal lattice. In another embodiment, at least 75 percent of the polaritonic nanoparticles have at least one diameter between 0.6 and 0.75 microns as measured along an axis of the crystal lattice. In yet another embodiment, the majority of the polaritonic nanoparticles have at least one diameter that is less, for example about 5%-10% less, than the wavelength corresponding to a resonant frequency of the polaritonic nanoparticle.

The coating material is such that it is stable at temperatures above 500° C., preferably above 1000° C. Suitable coating materials include aluminum oxide, erbium oxide, yttrium oxide, aluminum nitride, silicon nitride, indium nitride, gallium nitride, or titanium aluminum nitride. In one embodiment, the coating material is alpha-aluminum oxide. In another embodiment, the coating material is selected from aluminum nitride, silicon nitride, indium nitride, gallium nitride, or titanium aluminum nitride. In yet another embodiment, the coating material is a carbonized form of one of the aforementioned nitrides. In yet another embodiment, the coating includes silicon carbide.

In one embodiment, the deposition of the coating material is performed using an atomic layer deposition (ALD) process. For example, during the process nitrogen or argon gas bubbles through a trimethylaluminum liquid source with a flow rate of about 300 standard cubic centimeters per minute (sccm) and gas precursor ozone flowing at about 300 sccm through the chamber at the same time. In another example, the chamber pressure is controlled to about 0.10 Torr and deposition temperature is controlled at about 450° C. In order to assure purity of the deposited layer, trimethylaluminum can be purified according to the disclosure of U.S. Pat. No. 7,179,931. In another embodiment, a chemical vapor deposition method is used to coat the polaritonic nanoparticles, such as described in U.S. Patent Application Publication No. 20090324825. In yet another embodiment, a polymer-assisted chemical vapor deposition method is used to coat the polaritonic nanoparticles, such as describe in U.S. Pat. No. 7,396,563.

Using such deposition methods allows for strict control of the thickness of the coating material. In one embodiment for any method of the invention, that thickness is controlled to be between about 5 nm and about 20 nm. In another embodiment, the thickness is between about 5 nm and about 10 nm. In yet another embodiment, the thickness is about 5, 6, 7, 8, 9, or 10 nm.

In one embodiment, the coating material has a wide bandgap. In one embodiment, the coating does not substantially absorb electromagnetic energy having a frequency of greater than or equal to 353 terahertz (wavelength=850 nm) and less than or equal to 1250 terahertz (wavelength=240 nm). In another embodiment, the coating does not substantially absorb electromagnetic energy having a frequency of greater than or equal to 375 terahertz (wavelength=800 nm) and less than or equal to 850 terahertz (wavelength=353 nm). In yet another embodiment, the coating does not substantially absorb electromagnetic energy having a frequency of greater than or equal to 430 terahertz (wavelength=698 nm) and less than or equal to 850 terahertz (wavelength=353 nm). The phrases "not substantially absorb" and "not substantially absorbing" as used herein indicates that the coatings in such implementations are sufficiently non-absorbing that they do not increase the single pass loss of energy transmitted by the polaritonic nanoparticle to more than about 5%, preferably not to more than about 1%.

In one embodiment, a second plasmon forms at the interface of the coating material and the polaritonic nanoparticle, wherein the frequencies of the first plasmon and the second plasmon overlap with the frequency of the exciton in the matrix material.

In another embodiment, the coating material includes a bandgap that overlaps with the frequency of the second plasmon.

In one embodiment, the voltage control device provides electromagnetic energy to the electrodes at a voltage of greater than or equal to 2000 volts. In another embodiment, the voltage control device provides electromagnetic energy to the electrodes at a voltage of greater than or equal to 3500 volts.

In one embodiment, the voltage control device provides electromagnetic energy to the electrodes in the form of a pulsed direct current. In a another embodiment, the voltage control device includes an insulated gate bipolar transistor. In yet another embodiment, the pulsed direct current is delivered at a frequency of greater or equal to 50 kilohertz and less than or equal to 1000 terahertz.

Uses of the Energy Storage Device

The polartonic nanoparticles of the invention support energy waves, including those related to bosonic quasiparticles resulting from the strong coupling of electromagnetic waves with an electric or magnetic dipole-carrying excitation. When the energy waves are confined by the introduction of a bandgap in the coating material, the polaritonic nanoparticles store energy. As shown in FIG. 1, one mechanism for transferring energy to the nanoparticles is to form an energy field in the dielectric composition by creating a voltage differential between two electrodes. Such an energy field creates surface plasmons on the electrodes, excitons resulting from the relaxation of the electret electron-hole pairs in the matrix material, and polaritons resulting from the electroluminescent production of photons in the semiconducting polaritonic nanoparticles. When the frequencies of the plasmons associated with the electrodes, the electrets associated with the matrix material, and the polaritons associated with the polaritonic nanoparticles overlap, energy can be efficiently transferred via a resonant energy transfer process to and from the electrodes to the polaritonic nanoparticles.

Accordingly, the present invention features a method for storing energy that includes: (a) providing multiple polaritonic nanoparticles comprising a paramagnetic atom and having at least one resonant frequency, wherein the polaritonic nanoparticles are uniformly coated with a coating material that attenuates the propagation of electromagnetic energy of the at least one resonant frequency through the coating material, and wherein the majority of the polaritonic nanoparticles are within a predetermined diameter range; (b) placing the coated polaritonic nanoparticles in contact with an electret-containing matrix material to form a composition; (c) placing the composition in contact with electrodes comprising an anode and a cathode connected to a voltage control device that is connected to a power source; (d) providing a high voltage electric current to the anode and cathode via the voltage control device to generate an electric field of a strength sufficient to generate a first plasmon on the surface of the anode and the cathode, excitons in the electret-containing matrix material, and a polariton in the polaritonic nanoparticles, wherein the resonance frequencies of each of the first plasmon, the exciton, and the polariton overlap; and (e) removing the electric current, thereby storing the energy as electromagnetic energy waves in the polaritonic nanoparticles.

In one embodiment of any method of the invention, the energy stored is electromagnetic energy.

In one embodiment of any method of the invention, each of the electrodes includes aluminum, copper, indium, gallium, gold, or silver. In a further embodiment, each of the electrodes includes aluminum.

In another embodiment of any method of the invention, each of the electrodes has a thickness of from about 0.1 micron to about 1.0 micron, such as for example, about 0.1 micron, about 0.1 micron, about 0.15 micron, about 0.2 micron, about 0.3 micron, about 0.4 micron, about 0.5 micron, or about 1.0 micron.

In another embodiment of any method of the invention, each of the electrodes supports a plasmon wavelength in the UV, visible, or near-IR region. In another embodiment, the metallic nanoparticle supports a plasmon resonance in the UV region. In yet another embodiment, the metallic nanoparticle comprises aluminum and supports a plasmon resonance with a wavelength in the range of about 350 nm to about 400 nm.

Figure 2:
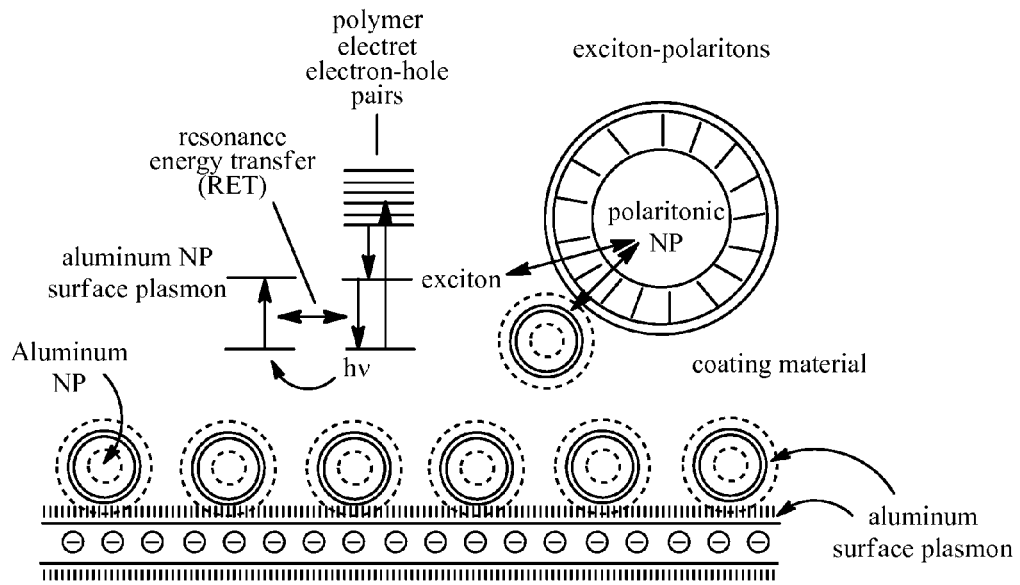
FIG. 2 includes an illustration of one embodiment of the invention in which the electrodes of the energy storage device are coated with surface plasmon-supporting metallic nanoparticles.

In one embodiment of any method of the invention, the surface of at least one of the electrodes that contacts the matrix material is coated with a layer of metallic nanoparticles, such as aluminum, copper, indium, gallium, gold, or silver nanoparticles. In such a configuration the metallic nanoparticles may also support surface plasmons, and their presence can increase the interaction between the excitons in the matrix material and plasmons associated with the electrodes, as shown in FIG. 2. In a further embodiment, the metallic nanoparticle includes aluminum. The metallic nanoparticles may be essentially entirely metal or be in the form of a core-shell composition, with the core comprising a low dielectric material (e.g., silicon dioxide or aluminum oxide) and the shell essentially consisting of the metal or the core essentially consisting of the metal and the shell comprising a low dielectric material (e.g., silicon dioxide or aluminum oxide). The metallic nanoparticle coating that adjoins each electrode may extend into the matrix material to a depth of about 0.1% to about 1% of the distance between the electrodes.

In an arrangement in which the metallic nanoparticles do not only directly contact the electrodes, electromagnetic energy can be transferred directly from the surface plasmons of the metallic nanoparticles to the resonant energy waves in the polaritonic nanoparticles that are not direcly proximal to the electrodes. Accordingly, in another embodiment of any method of the invention, the metallic nanoparticles are dispersed in the matrix material to a depth of about 5%, 10%, 20%, or 30% of the distance between the electrodes and accounts for up to about 10% of the total volume of the matrix material such as, for example, about 0.1%, 0.5%, 1%, 2%, 3%, 4%, 5%, or 10% of the total volume of matrix material where the metallic nanoparticles are present. In another embodiment, metallic nanoparticles are evenly distributed throughout the matrix material and accounts for up to about 10% of the total volume of the matrix material such as, for example, about 0.1%, 0.5%, 1%, 2%, 3%, 4%, 5%, or 10% of the total volume of matrix material.

In yet another embodiment of any method of the invention, the coating material of the polaritonic nanoparticles is further coated with one or more layers of metallic nanoparticles, thereby forming a metal/insulator/semiconductor layering arrangement. In a further embodiment, the metallic nanoparticle coating is from about 2 nm to about 100 nm thick.

In one embodiment of any method of the invention, the metallic nanoparticle supports a plasmon wavelength in the UV, visible, or near-IR region. In another embodiment, the metallic nanoparticle supports a plasmon resonance in the UV region. In yet another embodiment, the metallic nanoparticle comprises aluminum and supports a plasmon resonance of about 350 nm to about 800 nm.

In another embodiment of any method of the invention, the metallic nanoparticles have a minimum diameter (i.e., the diameter of its smallest geometrical feature) of from about 5 to about 100 nanometers. In a further embodiment, the metallic nanoparticles have a minimum diameter of about 20 to about 50 nanometers. In another embodiment, the metallic nanoparticles have a minimum diameter of about 50 nanometers with an aluminum core and an aluminum oxide shell of about 2 nanometers.

In another embodiment of any method of the invention, the metallic nanoparticles are spherical. In yet another embodiment, the metallic nanoparticles have triangular geometrical features.

In one embodiment of any method of the invention, the surface of at least one of the electrodes contacting the matrix material is corrugated, where the length of the ridges of the corrugation is orthogonal to the direction of the electric field in the dielectric composition. In another embodiment, adjacent ridges of the corrugation are separated from each other by about a distance of less than the first plasmon frequency.

In order to form the electret-containing matrix in the energy storage device of the invention, an electric field is applied to the polaritonic nanoparticle-containing matrix material composition at a suitable voltage when the temperature is at or above the matrix material's glass temperature ($T_g$) but below the melting temperature. In one embodiment of any method of the invention, the matrix material has a glass temperature that is greater than or equal to 60° C. In a further embodiment, the matrix material's glass temperature is greater than or equal to 80° C. Typically, constant voltage is applied to the electrodes in contact with the composition at the chosen temperature and the composition is cooled to about 23° C. while the constant voltage is still being applied. Exemplary voltages are in the range of from 2000 to 5000 volts. Typically, the cooling time is 5 minutes to 30 minutes. In one embodiment, a corona poling technique is used and the electric field is oriented 20 degrees to 60 degrees in relation to the planar layers of dielectric material. In another embodiment, a corona poling technique is used and the electric field is oriented 40 degrees to 50 degrees in relation to the planar layers of dielectric material. In yet another embodiment, a corona poling technique is used and the electric field is oriented 45 degrees in relation to the planar layers of dielectric composition.

In one embodiment of any method of the invention, the electret-containing matrix includes an organic polymer or co-polymer that includes aromatic ring systems such as, for example, polymers containing phenyl, naphthalene, anthracene, phenanthrene, tetracene, pyrene, benzopyrene, chrysene, picene, carbazole, fluorene, biphenyl, terphenyl, triphenylene oxide, dihalobiphenyl, trans-stilbene, and 1,4-diphenylbutadiene moieties. Specific examples include: (i) polyethylene terephthalate (PET, $T_g$=75° C.); (i) polyethylene naphthalate (PET, $T_g$=120° C.); (iii) polycarbonate (PC, $T_g$=152° C.); (iv) polyetherimide (PEI, $T_g$=231° C.); (v) biphenyl tetracarboxylic acid dianhydride-paraphenylerediamine polyimide (BPDA/PDA, $T_g$=320° C.; (vi) 4' acryloxyamino-4 nitroazobenzene ($T_g$>180° C.), or (vii) 4-[N-(2-maleimidoethyl)-N-methylamino]-4'-nitroazobenzene (MENA)/alpha-methylstyrene co-polymer ($T_g$=160° C.).

In a further embodiment of any method of the invention, an additional polymer is mixed with the aromatic ring-containing polymer to reduce oxygen and/or water permeability. Examples of polymer additives include polyvinyl alcohol by itself or containing other additives.

In another further embodiment of any method of the invention, $Ti(OBu)_4$ is used as catalyst for preparation of the polymers to be used in the electret-containing matrix of the invention.

In one embodiment of any method of the invention, the volume ratio of the electret-containing matrix material to coated polaritonic nanoparticles in the dielectric layer established between electrodes is from 40/60 to 5/95.

In one embodiment of any method of the invention, the polaritonic nanoparticles are $ABO_3$ perovskite ceramic crystals having a Curie temperature of less than or equal to 80° C. In a further embodiment, the polaritonic nanoparticles have a Curie temperature of less than or equal to 23° C. In another embodiment, each of the polaritonic nanoparticles has a cubic crystal lattice. In yet another embodiment, the polaritonic nanoparticles assume the geometry of cubic class 432.

In one embodiment of any method of the invention, the polaritonic nanoparticles are a modified $BaTiO_3$ perovskite that includes a paramagnetic atom having one unpaired d-electron at the B-site, where the Ti is replaced by the paramagnetic atom at a molar ratio of up to and including 0.1. In a further embodiment, the magnetic moment of the paramagnetic atom is in excess of 1/2, for example, 5/2 to 7/2. Such atom include $Co^{2+}$, $Cr^{3+}$, $Mn^{2+}$, or $Gd^{2+}$. In one embodiment, the paramagnetic atom is $Mn^{2+}$ or $Gd^{2+}$. In a further embodiment, the paramagnetic atom is $Mn^{2+}$.

In another embodiment the polaritonic nanoparticles include Sn at the B-site with a Sn molar ratio of up to and including 0.5. In a further embodiment, the polaritonic nanoparticles include Sn at the B-site with a Sn molar ratio of up to and including 0.2.

In one embodiment of any method of the invention, the polaritonic nanoparticle of the invention has the formula $(Ba_{1-x-y}Ca_xA_y)[Ti_{1-a-b-c}Sn_aB_bM_c]O_3$, wherein A is Ag, Gd, Mg, Nd, Pr, or Sr; B is Al, Dy, Er, Ga, Ho, La, Nb, Ni, Sc, Ta, Y, Yb, Zn, Zr, or V; M is Co, Cr, Mn, or Gd; x is 0 to 0.1; y is 0 to 0.1; a is 0.01 to 0.5; b is 0 to 0.3; and c is 0.001 to 0.05, wherein 1-a-b-c is greater than or equal to 0.5. Examples include $(Ba_{0.96}Ca_{0.04})[Ti_{0.815}Mn_{0.0025}Nb_{0.0025}Zr_{0.10}Sn_{0.08}]O_3$, $(Ba_{0.9575}Ca_{0.04}Nd_{0.0025})[Ti_{0.8175}Mn_{0.0025}Y_{0.10}Sn_{0.08}]O_3$, $(Ba_{0.9575}Ca_{0.04}Nd_{0.0025})[Ti_{0.8175}Mn_{0.0025}Zr_{0.10}Sn_{0.08}]O_3$, and $(Ba_{0.9575}Ca_{0.04}Nd_{0.0025})[Ti_{0.8175}Mn_{0.0025}Sn_{0.18}]O_3$.

In another embodiment of any method of the invention, the polaritonic nanoparticle of the invention has the formula $(Ba_{1-x-y}Ca_xA_y)[Ti_{1-a-b-c}Sn_aB_bM_c]O_3$, wherein A is Gd, Mg, Nd, Pr, or Sr; B is Ta, Y, Zn, or Zr; M is Co, Cr, Mn, or Gd; x is 0 to 0.1; y is 0 to 0.1; a is 0.01 to 0.1; b is 0 to 0.1; and c is 0.001 to 0.05.

In another embodiment of any method of the invention, the polaritonic nanoparticle of the invention has the formula $(Ba_{1-x-y}Ca_xA_y)[Ti_{1-a-b-c}Sn_aB_bM_c]O_3$, wherein A is Gd, Mg, Nd, Pr, or Sr; B is Ta, Y, Zn, or Zr; M is Co, Cr, or Gd; x is 0 to 0.1; y is 0 to 0.1; a is 0 to 0.5; b is 0 to 0.3; and c is 0.001 to 0.05, wherein 1-a-b-c is greater than or equal to 0.5. Examples include $(Ba_{0.9575}Ca_{0.04}Nd_{0.0025})[Ti_{0.8175}Gd_{0.0025}Y_{0.18}]O_3$ and $(Ba_{0.9575}Ca_{0.04}Nd_{0.0025})[Ti_{0.8175}Cu_{0.0025}Y_{0.18}]O_3$.

Another exemplary polaritonic nanoparticle useful in the methods of the invention has the formula $Ca(Cu_{3-x}A_x)[Ti_{4-a-b-c}Sn_aB_bM_c]O_{12}$, wherein A is Zn, Mg, Nd, Pr, or Sr; B is Al, Dy, Er, Ga, Ho, La, Nb, Ni, Sc, Ta, Y, Yb, Zn, Zr, or V; M is Co, Cr, Mn, or Gd; x is 0 to 0.15; a is 0 to 0.5; b is 0 to 0.3; and c is 0.001 to 0.05, wherein 1-a-b-c is greater than or equal to 0.5.

Yet other exemplary polaritonic nanoparticles useful in the methods of the invention has the formula $Ca(Cu_{3-x}A_x)[Ti_{4-a-b-c}Sn_aB_bM_c]O_{12}$, wherein A is Zn, Mg, Nd, Pr, or Sr; B is Al, Dy, Er, Ga, Ho, La, Nb, Ni, Sc, Ta, Y, Yb, Zn, Zr, or V; M is Co, Cr, Mn or Gd; x is 0 to 0.1; a is 0 to 0.2; b is 0 to 0.1; and c is 0.001 to 0.05. In one embodiment, a is 0.05 to 0.2.

In one embodiment for any method of the invention, the energy storage device includes polaritonic nanoparticles, the majority of which are of cubic or spherical geometry and having at least one diameter that is less than or equal to about 0.9 microns as measured along an axis of the crystal lattice. In another embodiment, at least 75 percent of the polaritonic nanoparticles have at least one diameter between 0.6 and 0.75 microns as measured along an axis of the crystal lattice. In yet another embodiment, the majority of the polaritonic nanoparticles have at least one diameter that is less, for example about 5%-10% less, than the wavelength corresponding to a resonant frequency of the polaritonic nanoparticle.

The coating material is such that it is stable at temperatures above 500° C., preferably above 1000° C. Suitable coating materials include aluminum oxide, erbium oxide, yttrium oxide, aluminum nitride, silicon nitride, indium nitride, gallium nitride, or titanium aluminum nitride. In one embodiment for any method of the invention, the coating material is alpha-aluminum oxide. In another embodiment, the coating material is selected from aluminum nitride, silicon nitride, indium nitride, gallium nitride, or titanium aluminum nitride. In yet another embodiment, the coating material is a carbonized form of one of the aforementioned nitrides. In yet another embodiment, the coating includes silicon carbide.

In one embodiment for any method of the invention, the deposition of the coating material is performed using an atomic layer deposition process, which allows for strict control of the thickness of the coating material. In one embodiment for any method of the invention, that thickness is controlled to be between about 5 nm and about 20 nm. In another embodiment, the thickness is between about 5 nm and about 10 nm. In yet another embodiment, the thickness is about 5, 6, 7, 8, 9, or 10 nm.

In one embodiment for any method of the invention, the coating material has a wide bandgap. In one embodiment, the coating does not substantially absorb electromagnetic energy having a frequency of greater than or equal to 353 terahertz (wavelength=850 nm) and less than or equal to 1250 terahertz (wavelength=240 nm). In another embodiment, the coating does not substantially absorb electromagnetic energy having a frequency of greater than or equal to 375 terahertz (wavelength=800 nm) and less than or equal to 850 terahertz (wavelength=353 nm). In yet another embodiment, the coating does not substantially absorb electromagnetic energy having a frequency of greater than or equal to 430 terahertz (wavelength=698 nm) and less than or equal to 850 terahertz (wavelength=353 nm). The phrases "not substantially absorb" and "not substantially absorbing" as used herein indicates that the coatings in such implementations are sufficiently non-absorbing that they do not increase the single pass loss of energy transmitted by the polaritonic nanoparticle to more than about 5%, preferably not to more than about 1%.

In one embodiment for any method of the invention, a second plasmon forms at the interface of the coating material and the polaritonic nanoparticle, wherein the frequencies of the first plasmon and the second plasmon overlap with the frequency of the exciton in the matrix material.

In another embodiment for any method of the invention, the coating material includes a bandgap that overlaps with the frequency of the second plasmon.

Method for Forming Energy Storage Metamaterials

Figure 3:
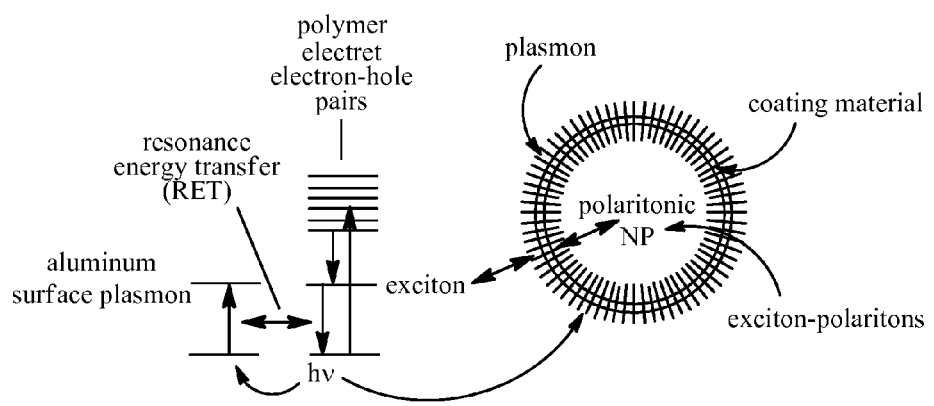
FIG. 3 includes an illustration of one embodiment of the invention that exemplifies the formation of surface plasmons in the coated polaritonic nanoparticles.

Because of the inclusion of a paramagnetic atom in the polaritonic nanoparticles of the invention, these nanoparticles can have multiferroic properties, meaning that both ferroelectric and magnetic orders coexist and are coupled. In some cases, the response of the permittivity (c) or the permeability (g) of a multiferroic substance to an external stimulus may be anisotropic, e.g., the orientation of the substance in relation to the stimulus has a non-negligible effect on permittivity or permeability. Accordingly, in one embodiment of the present invention, the polaritonic nanoparticles have both negative permittivity and permeability at certain electromagnetic energy wave frequencies under the influence of the field created by the voltage differential at the electrodes. Under such conditions, surface plasmons are created at the interface between the polaritonic nanoparticles and the coating material. The resulting plasmons can receive energy from another active medium (e.g., excitons in the matrix material or other plasmons created by metal nanoparticles) via a radiationless resonant energy transfer mechanism. See FIG. 3. This transfer of energy causes a buildup of a macroscopic number of surface plasmons in a single mode. Unlike photons, the energy associated with the plasmons is localized within a nanoscale region and radiative light waves are not emitted. The result is the formation of a highly localized quasi-static electric field of energy in each polaritonic nanoparticle.

Metamaterials are artificial electromagnetic media structured on a scale much shorter than their operating wavelengths. Their basic cells are generally constituted of resonant inclusions which yield a $\pi$ phaseshift in the material response above the resonant frequency. As a consequence, their effective permittivity and/or permeability can be negative either in separate or overlapping frequency bands, a unique and distinct property that is not observed in naturally-occurring materials. It is known that non-magnetic (e.g., paramagnetic) cubic or spherical materials having high permittivity values (e.g., greater than 2000) can be employed to induce negative permeability and/or permittivity effects at different resonance frequencies (e.g., those frequencies corresponding to resonances that scatter particularly strongly or weakly based on the size of the cubic or spherical material). It is also known that the properties of metamaterials can be dependent upon the presence of external stimuli, such as the presence of an external electrical field.

Accordingly, in another aspect, the invention features a method of creating a metamaterial for storing energy comprising:

(a) providing multiple cubic or spherical polaritonic nanoparticles comprising a paramagnetic atom and having at least one resonant frequency, wherein the polaritonic nanoparticles are uniformly coated with a coating material that attenuates the propagation of electromagnetic energy of the at least one resonant frequency through the coating material, and wherein the majority of the polaritonic nanoparticles are within a predetermined diameter range;

(b) placing the coated polaritonic nanoparticles in contact with matrix material capable of supporting electrets to form a composition, wherein the polaritonic nanoparticles comprise at least 85% of the volume of the composition;

(c) placing the composition in contact with an anode and a cathode connected to a voltage control device that is connected to a power source;

(d) heating the matrix material to a heating temperature above its glass temperature but below its melting temperature;

(d) while the matrix material is at the heating temperature, providing a high voltage electric current to the anode and cathode via the voltage control device to generate an electric field of a strength sufficient to form electron-hole pairs in the matrix material;

(e) cooling the matrix material to about 23° C. for a predetermined period of time while the electric field is still intact; and (f) removing the electric field.

In one embodiment, the electrodes include aluminum, the matrix material is polyethylene terephthalate, the coating material is alpha-aluminum oxide and the polaritonic nanoparticle is selected from $(Ba_{0.96}Ca_{0.04})$ $[Ti_{0.815}Mn_{0.0025}Nb_{0.0025}Zr_{0.10}Sn_{0.08}]O_3$, $(Ba_{0.9575}Ca_{0.04}Nd_{0.0025})$ $[Ti_{0.8175}Mn_{0.0025}Y_{0.10}Sn_{0.08}]O_3$, $(Ba_{0.9575}Ca_{0.04}Nd_{0.0025})$ $[Ti_{0.8175}Mn_{0.0025}Zr_{0.10}Sn_{0.08}]O_3$, or $(Ba_{0.9575}Ca_{0.04}Nd_{0.0025})$ $[Ti_{0.8175}Mn_{0.0025}Sn_{0.18}]O_3$.

In another embodiment, the metamaterial operates at a resonant frequency of about 0.1 terahertz (λ=3000 μm) to about 1000 terahertz (λ=0.30 μm).

In another embodiment, the metamaterial operates at a resonant frequency of about 790 terahertz (lambda=380 nm). In another embodiment, the metamaterial operates at a resonant frequency of about 395 terahertz (lambda=760 nm).

In another embodiment, the energy stored in the metamaterial is electromagnetic energy in which the magnetic component is commensurate with the electric component at one or more frequencies of from about 0.1 terahertz (λ=3000 μm) to about 1000 terahertz (λ=0.30 μm).

In another embodiment, the voltage control device provides electromagnetic energy to said electrodes in the form of a pulsed direct current. In a further embodiment, the pulsed direct current frequency corresponds to at least one of the resonant frequencies of the metamaterial.

EXAMPLES

Construction of the energy storage device of the present invention begins with the preparation of the polaritonic nanoparticles. The following example given for the preparation of $(Ba_{0.9575}Ca_{0.04}Nd_{0.0025})$ $[Ti_{0.8175}Mn_{0.0025}Zr_{0.10}Sn_{0.08}]O_3$, is illustrative and should not be considered limiting. It should be noted that only reagents and solvents of the highest purity should be used in the preparation of the materials described herein. Disadvantageous amounts of undesirable ions could severely compromise the optical characteristics of the polaritonic nanoparticles of the present invention. Accordingly, doubly-deionized water should be employed for all procedures with adequate attention also paid to the cleanliness of the reactions vessels used.

Water-soluble forms of barium [barium nitrate, $Ba(NO_3)_2$], calcium [calcium nitrate, $Ca(NO_3)_2$] and titanium (titanium bis(ammonium 2-hydroxypropanato) dihydroxide $[(CH_3CH(O—)CO_2NH_4)_2Ti(OH)_2]$) are commercially available in their puriss forms. The water-soluble chelate precursor of zirconium [zirconium(IV) bis(ammonium 2-hydroxypropanato)dihydroxide, $(CH_3CH(O—)CO_2NH_4)_2Zr(OH)_2$]] is prepared by reacting with zirconium (IV) isopropoxide with 2-hydroxypropanoic acid [lactic acid, $CH_3CH(OH)COOH$], 85 wt % in aqueous solution, followed with ammonium hydroxide (28 wt % ammonia in water). Water-soluble chelated forms of neodymium $[(CH_3CH(O—)CO_2NH_4)_3Nd]$ and manganese $[(CH_3CH(O—)CO_2NH_4)_2Mn]$ are prepared in a manner similar to that for the preparation of the chelated form of zirconium described above. See U.S. Patent Appl. Pub. No. 20100285947.

The preparation of a suitable water-soluble tin(IV) chelate can be somewhat problematic due to hydrolytic lability of many tin(IV) compounds. However, the preparation of water-soluble 5,12-dimethylstannadiatrane $[CH_3N(CH_2CH_2O—)_2)_2Sn]$ has been described [Kostyanovskii et al., *Russ. Chem. Bull., Vol.* 17(2), pages 266-269 (1968)] and this intermediate can be used in the formation of the target polaritonic nanoparticle.

The barium, calcium, neodymium, titanium, zirconium, tin, and manganese, intermediates described above are combined in the appropriate molar ratios (0.47875, 0.02000, 0.00125, 0.40875, 0.05000, 0.04000, and 0.00125, respectively) to form an aqueous solution (the chelate solution). Separately, an aqueous solution of tetramethylammonium oxalate and tetramethylammonium hydroxide (the precipitate solution) is prepared and the chelate solution and the precipitate solution are mixed together at 95° C.-99° C., keeping the pH in a range of 8 to 12, preferably about 10.5. The mixing should be performed using a turbulent mixer, such as a coaxial fluid jet mixer See, for example, U.S. Pat. No. 7,867,471. The resulting precipitate can be collected by filtration, centrifugation, or by some other manner known to those skilled in the art.

The collected polaritonic nanoparticles are then calcined at high temperature (for example, 1000° C. to 1100° C.) such that they are suitably densified. The calcined particles can be sized by filtration using filters with the appropriate porosity.

The $(Ba_{0.9575}Ca_{0.04}Nd_{0.0025})$ $[Ti_{0.8175}Mn_{0.0025}Zr_{0.10}Sn_{0.08}]O_3$ nanoparticles can be coated by methods known to those skilled in the art. In one example the nanoparticles are coated with alpha-aluminum oxide by atomic layer deposition.

The energy storage device of the invention can be constructed by multilayer capacitor-forming methods that are known to a person skilled in the art. Suitable materials that can be included in the electrodes include aluminum, copper, indium, gallium, gold, or silver; or mixtures thereof. In one embodiment, the electrode comprises aluminum because of its relatively low cost, low resistivity, and because aluminum can support surface plasmons with frequencies in the ultraviolet range.

In one example, multiple layers of aluminum electrodes are printed with screening ink from aluminum powder. Interleaved between aluminum electrodes are dielectric layers with screening ink from coated polaritonic nanoparticles immersed in a polymer matrix. Each screening ink contains appropriate amounts of nitrocellulose, glycerol, and isopropyl alcohol, resulting in a proper rheology for screen printing each type of layer: the aluminum electrode, the coated polaritonic nanoparticles immersed in polymer, aluminum nanoparticles immersed in polymer (if desired), or the polymer by itself. The number of these layers can vary depending on the electrical energy storage requirements. Each layer is dried; the binder burned out, and sintered before the next layer is screen-printed. The electrode layers can be offset through the use of various printing or masking procedures known to those skilled in the art. The layers are screen-printed on top of one another in a continuous manner. When the specified number of layers is achieved, the array can be cut into individual components to specified sizes. In addition, if patterns are desired on the layers being printed (e.g., corrugation patterns) for tuning the surface plasmon resonances localized on the electrodes, techniques such as interference lithography can be employed. Alternatively, the surface of the electrodes can be chemically etched to fine-tune the electrode plasmon resonances.

After each screen-printing operation in which a sheet is fabricated having, for example, about a 1.0 micron thickness for the aluminum layers and about a 10 micron thickness for the matrix layer containing the coated polaritonic nanoparticles, a drying, binder-burnout, and sintering operation is performed. The oven has multiple temperature zones that range from 40° C. to 125° C. and the sheet is passed through these zones at a rate that avoids any cracking and delamination of the body.

After the layers are printed, the resulting capacitor component is then subjected to hot isostatic pressing (HIP) at a temperature above the glass temperature but below the melting temperature of the polymer and under 100 bar pressure of an inert gas, such as argon. The HIP processing time is 45 minutes, which includes a 10-minute temperature ramp time and a 5-minute cool-down time. The components are then abrasively cleaned on the connection side to expose the alternately offset interleaved aluminum electrodes. Then aluminum end caps are bonded onto each end component that has the aluminum electrodes exposed with the use of a silver-filled epoxy resin as the adhesive. The components are then cured at 100° C. for 10 minutes to bond the aluminum end caps to the components.

The component is then placed into an oven where the temperature is increased to a temperature above the glass temperature but below the melting temperature of the polymer over a period of 20 minutes. At the designated temperature, a voltage of −2000 V is applied to the cathode and +2000 V is applied to the anode for a period of 5 minutes and the component is then cooled to about 23° C. while voltage is still being applied. A typical cooling period is from 5 to 30 minutes. Once component is cooled and the voltage is removed, the electret-containing matrix material is formed.

The energy storage components so formed can then be connected to one or more voltage control devices and electrically joined together in parallel in numbers appropriate for specific energy storage usages.

What is claimed is:

1. A device for storing energy comprising two electrodes consisting of an anode and a cathode, a voltage control device connected to a power source, and a dielectric composition between said two electrodes, wherein said dielectric composition comprises:

(a) multiple polaritonic nanoparticles, the majority of which have diameters within a predetermined range, wherein each of said polaritonic nanoparticles has at least one resonant frequency and comprises a paramagnetic atom;

(b) a coating material in contact with said polaritonic nanoparticles, wherein said coating material completely encapsulates each of said polaritonic nanoparticles with a uniform thickness and comprises a bandgap attenuating the propagation of electromagnetic energy of at least one resonant frequency through said coating material; and (c) an electret-containing matrix material in contact with said coating material and said electrodes, wherein when a voltage differential is created between said two electrodes by said voltage control device, an electric field is created in said dielectric composition, an exciton is created in said matrix material, and a first plasmon forms at the interface of said electrodes and said matrix material, wherein a resonant frequency of said exciton overlaps with a resonant frequency of said first plasmon and that of a resonant frequency of an electromagnetic energy wave in said polaritonic nanoparticle, wherein said polaritonic nanoparticles comprise a perovskite ceramic material having a Curie temperature less than or equal to 23° C.

2. The device of claim 1, wherein each of said electrodes comprises aluminum.

3. The device of claim 1, wherein the surface of at least one of said electrodes that contacts said matrix material is coated with a layer of aluminum nanoparticles, wherein said coating extends into said matrix material to a depth of about 0.1% to about 1% of the distance between said electrodes.

4. The device of claim 1, wherein the surface of at least one of said electrodes contacting said matrix material is corrugated, wherein the length of the ridges of the corrugation is orthogonal to the direction of said electric field.

5. The device of claim 1, wherein said electret-containing matrix material comprises an organic polymer or co-polymer, wherein said polymer or co-polymer comprises an aromatic or heteroaromatic ring.

6. The device of claim 1, wherein said electret-containing matrix material comprises polyethylene terephthalate.

7. The device of claim 1, wherein each of said polaritonic nanoparticles comprises a paramagnetic atom having one unpaired d-electron.

8. The device of claim 7, wherein said paramagnetic atom is $Co^{2+}$, $Cr^{3+}$, $Mn^{2+}$ or $Gd^{2+}$.

9. The device of claim 7, wherein said paramagnetic atom is $Mn^{2+}$.

10. The device of claim 1, wherein said polaritonic nanoparticles have the formula:

$(Ba_{1-x-y}Ca_xA_y)[Ti_{1-a-b-c}Sn_aB_bM_c]O_3$, wherein

A is Gd, Mg, Nd, Pr, or Sr;
B is Ta, Y, Zn, or Zr;
M is Co, Cr, Mn, or Gd;
x is 0 to 0.1;
y is 0 to 0.1;
a is 0.01 to 0.1;
b is 0 to 0.1; and
c is 0.001 to 0.05.

11. The device of claim 1, wherein said polaritonic nanoparticles are selected from $(Ba_{0.96}Ca_{0.04})[Ti_{0.815}Mn_{0.0025}Nb_{0.0025}Zr_{0.10}Sn_{0.08}]O_3$, $(Ba_{0.9575}Ca_{0.04}Nd_{0.0025})[Ti_{0.8175}Mn_{0.0025}Y_{0.10}Sn_{0.08}]O_3$, $(Ba_{0.9575}Ca_{0.04}Nd_{0.0025})[Ti_{0.8175}Mn_{0.0025}Zr_{0.10}Sn_{0.08}]O_3$, or $(Ba_{0.9575}Ca_{0.04}Nd_{0.0025})[Ti_{0.8175}Mn_{0.0025}Sn_{0.18}]O_3$.

12. The device of claim 1, wherein the majority of said polaritonic nanoparticles have a cubic crystal lattice and at least one diameter of less than or equal to 0.9 microns.

13. The device of claim 12, wherein the majority of said polaritonic nanoparticles have at least one diameter between 0.6 and 0.75 microns.

14. The device of claim 1, wherein said coating material comprises alpha-aluminum oxide.

15. The device of claim 1, wherein said coating material has a uniform thickness of about 10 nanometers.

16. The device of claim 1, wherein said bandgap attenuates the propagation of electromagnetic energy at frequencies between 353 terahertz (lambda=850 nm) and 1250 terahertz (lambda=240 nm), inclusive.

17. The device of claim 1, wherein said voltage control device provides electromagnetic energy to said electrodes at a voltage of greater than or equal to 2000 volts.

18. A method for storing energy comprising:
  (a) providing multiple polaritonic nanoparticles comprising a paramagnetic atom and having at least one resonant frequency, wherein said polaritonic nanoparticles are uniformly coated with a coating material that attenuates the propagation of electromagnetic energy of said at least one resonant frequency through said coating material, and wherein the majority of said polaritonic nanoparticles have diameters within a predetermined range;
  (b) placing said coated polaritonic nanoparticles in contact with an electret-containing matrix material to form a composition;
  (c) placing said composition in contact with an anode and a cathode connected to a voltage control device that is connected to a power source;
  (d) providing a high voltage electric current to the anode and cathode via said voltage control device to generate an electric field of a strength sufficient to generate a first plasmon on the surface of said anode and said cathode, excitons in said electret-containing matrix material, and a polariton in said polaritonic nanoparticles, wherein a resonant frequency of said exciton overlaps with a resonant frequency of said first plasmon and that of a resonant frequency of an electromagnetic energy wave in said polaritonic nanoparticle; and
  (e) removing said electric current, thereby storing the energy as electromagnetic energy waves in said polaritonic nanoparticles.

19. A method of creating a metamaterial for storing energy comprising:
  (a) providing multiple polaritonic nanoparticles comprising a paramagnetic atom and having at least one resonant frequency, wherein said polaritonic nanoparticles are uniformly coated with a coating material that attenuates the propagation of electromagnetic energy of said at least one resonant frequency through said coating material, and wherein the majority of said polaritonic nanoparticles have diameters within a predetermined range;
  (b) placing said coated polaritonic nanoparticles in contact with matrix material capable of supporting electrets to form a composition;
  (c) placing said composition in contact with an anode and a cathode connected to a voltage control device that is connected to a power source;
  (d) heating said matrix material to a heating temperature above its glass temperature but below its melting temperature;
  (e) while said matrix material is at the heating temperature, providing a high voltage electric current to the anode and cathode via said voltage control device to generate an electric field of a strength sufficient to form electron-hole pairs in said matrix material;
  (f) cooling said matrix material to about 23° C. for a predetermined period of time while said electric field is still intact; and
  (g) removing said electric field.

\* \* \* \* \*